United States Patent [19]
DeLuca et al.

[11] Patent Number: 5,701,312
[45] Date of Patent: Dec. 23, 1997

[54] METHOD AND APPARATUS FOR SELECTIVELY PROVIDING REPEAT MESSAGES IN A RADIO COMMUNICATION SYSTEM

[75] Inventors: Michael J. DeLuca, Boca Raton; James G. Mittel, Lake Worth, both of Fla.

[73] Assignee: Motorola, Inc., Schaumburg, Ill.

[21] Appl. No.: 627,720

[22] Filed: Apr. 1, 1996

[51] Int. Cl.$^6$ ........................................................ H04L 1/08
[52] U.S. Cl. ............................................................ 371/32
[58] Field of Search ................................................ 371/32

[56] References Cited

PUBLICATIONS

Sastry, A. R. K., "Improving Automatic Repeat–Request (ARQ) Performance on Satellite Channels Under High Error Rate Conditions", IEEE Trans. on Communications, Apr. 1975, pp. 436–439.

Bruneel, H. et al., "On the Throughput Performance of Some Continuous ARQ Strategies with Repeated Transmissions", IEEE Trans. on Communications, vol. COM–34, No. 3, Mar. 1986, pp. 244–249.

Kallel, S., "Efficient Adaptive Coding Rate Hybrid ARQ Protocols", ICC '92, pp. 953–957, Dec. 1992.

Primary Examiner—Stephen M. Baker

[57] ABSTRACT

A communication system (100) for selectively providing repeat messages includes a message transmission device (105) for normally transmitting messages a single time, for receiving repeat requests indicating that a previously transmitted message should be transmitted again, and for automatically transmitting future messages more than once in response to determining that a number of repeat requests exceeds a transmission threshold. A radio communication device (110) is included in the communication system (100) for receiving the messages and for generating a repeat request in response to determining that the previously transmitted message has not been correctly received.

26 Claims, 10 Drawing Sheets

METHOD AND APPARATUS FOR SELECTIVELY PROVIDING REPEAT MESSAGES IN A RADIO COMMUNICATION SYSTEM

FIELD OF THE INVENTION

This invention relates in general to radio communications, and more specifically to radio communication systems in which repeat messages are transmitted.

BACKGROUND OF THE INVENTION

Radio communication systems generally include terminals or other message transmission devices for transmitting messages to portable radio communication devices, such as pagers. In some conventional communication systems, messages are transmitted to pagers only a single time. Although single message transmissions use the radio frequency channel efficiently, some pagers, especially those located in fringe areas, may receive a transmitted message incorrectly or may not receive the transmitted message at all.

Other conventional communication systems therefore utilize time diversity to reduce the likelihood of missed messages and incorrectly received messages. In other words, messages in time diversity systems are transmitted more than one time so that a pager has multiple chances of correctly receiving a message. Although time diversity systems provide more reliable message delivery, radio frequency channels are inefficiently used since not all pagers require multiple message transmissions.

Thus, what is needed is a method and apparatus for reducing the likelihood of missed messages while efficiently utilizing the communication channel.

DESCRIPTION OF A PREFERRED EMBODIMENT

Figure 1:
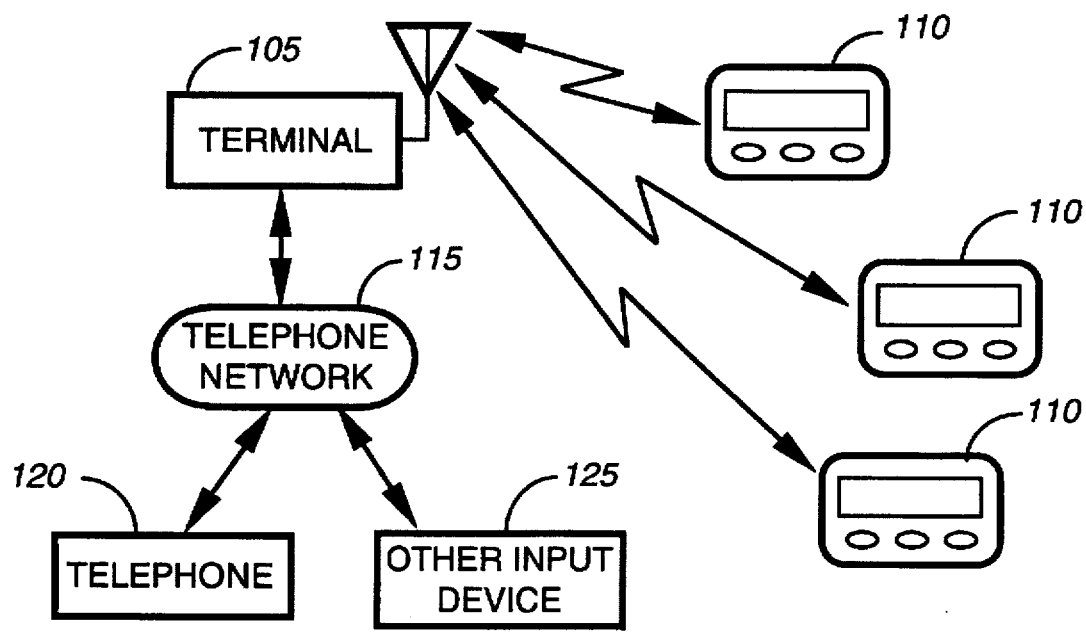
FIG. 1 is a diagram of a communication system in which repeat messages are selectively transmitted in accordance with the present invention.

FIG. 1 is a block diagram of a communication system 100, preferably a radio communication system, including a message transmission device, e.g., a terminal 105, for transmitting messages to radio communication devices 110, such as pagers. The terminal 105 can be coupled to a telephone network 115 for receiving the messages thereover. Messages are generally provided to the telephone network 115 by conventional telephones 120 or other input devices 125, such as personal computers. Information, such as pager addresses, usually accompanies message information for identifying the recipient radio communication devices 110. Each message is then transmitted to the recipient device 110.

Messages transmitted to different radio communication devices 110 are preferably numbered sequentially so that a radio communication device 110 can determine when a numbered message has been missed or incorrectly received. In response to determining that one or more previously transmitted messages have not been received correctly, the radio communication device 110 generates an alert, such as a visual display, to warn a user that at least one previously transmitted message has been missed. Thereafter, the user can contact the terminal 105, such as by using a telephone 120, to request the retransmission of the missed or erroneously received message.

Preferably, the terminal 105 normally transmits messages a single time such that the radio communication channel is efficiently used. However, it is likely that some radio communication devices 110 will be located in areas in which the radio frequency signal is fading or in which interference is present. In such a case, those radio communication devices 110 can miss messages often, resulting in numerous repeat requests from the users thereof. The repeat requests are indicative both of missed messages and incorrectly received messages. Therefore, the terminal 105 according to the present invention monitors the number of repeat requests associated with each radio communication device 110. When the number of repeat requests reaches a predetermined number for a particular device 110, the terminal 105 automatically begins sending repeat messages to the device 110.

In this manner, radio communication devices 110 that often miss messages are automatically provided with multiple transmissions of the same message so that the user is not required to constantly request additional transmissions. At the same time, devices 110 that have no difficulty with reception receive only one transmission of each message. As a result, the channel is efficiently used while minimizing the likelihood of missed and erroneously received messages.

Figure 2:
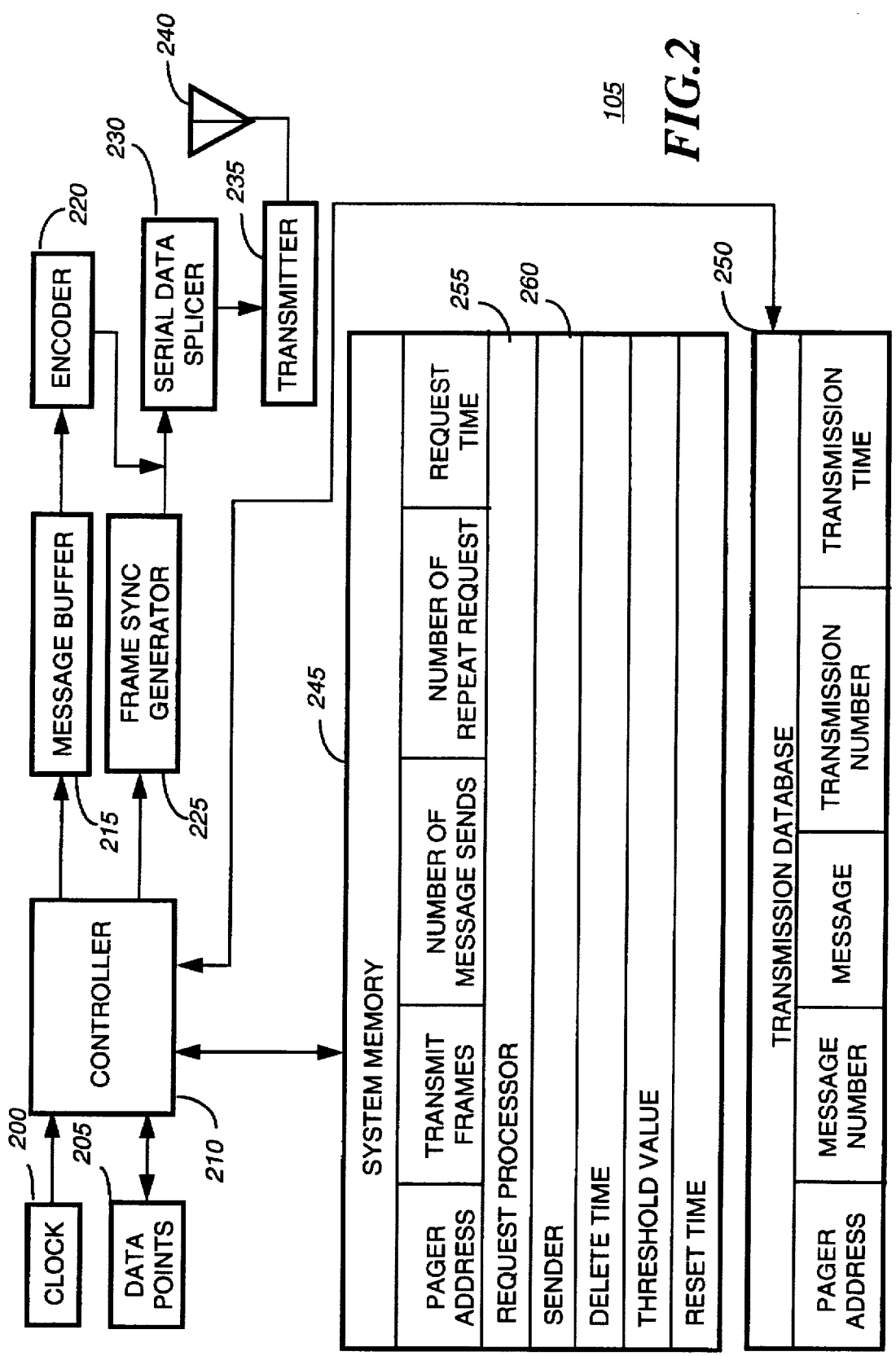
FIG. 2 is an electrical block diagram of a message transmission device included in the communication system of FIG. 1 for transmitting messages in accordance with the present invention.

Referring next to FIG. 2, an electrical block diagram of the terminal 105 is depicted. The terminal 105 preferably includes a controller 210 for controlling the operations thereof as well as a clock 200 for providing time values and data ports 205 for receiving information, such as repeat requests from users of the radio communication receivers 110 (FIG. 1). As messages are received from message originators, the messages are stored in a transmission database 250, which also stores message numbers assigned to the messages and pager addresses indicative of message recipients. According to the present invention, a transmission number is stored for each message to indicate how many times the message has been transmitted, and a transmission time shows the time of the most recent transmission for that message.

Messages can be transmitted to the radio communication devices 110 using a conventional signalling protocol, such as the FLEX™ protocol in which the radio signal is divided into cycles of one-hundred-twenty-eight (128) frames. The controller 210 generally gathers information, such as addresses, messages, and message numbers, to be transmitted during each frame into address, vector, and message fields. The information is then coupled to a message buffer 215 for temporarily storing the information until a time for further processing and transmission. Frames are transmitted in numeric sequence, so that while a current frame is being transmitted, the next frame to be transmitted is in the message buffer 215, and the next frame thereafter is being gathered by the controller 210. At the appropriate time, the information stored in the message buffer 215 is transferred to the encoder 220 for encoding the information into the signalling format.

The controller 210 next enables a frame sync generator 225, which generates the predetermined synchronization (sync) pattern that is transmitted at the start of each frame transmission. The sync pattern is multiplexed with the encoded information by the serial data splicer 230, which generates a message stream. The message stream is transmitted by a transmitter 235 over an antenna 240 for reception by the radio communication devices 110.

Further included in the terminal 105 is a system memory 245 for storing subscriber information, which preferably comprises a pager address of each device 110, the frames in which the devices 110 are to receive messages, and a number of message sends, i.e., the number of times a message is to be sent to each device 110. Additionally, the subscriber information includes a number of repeat requests that have been generated by a radio communication device 110 and a request time associated with the most recent repeat request. Initially, the number of message sends is set to one, and the number of repeat requests is set to zero. These variables can be periodically reset at times indicated by a reset time also stored in the system memory 245. A delete time stored in the system memory 245 indicates when old messages are to be deleted from the transmission database 250, and a threshold value indicates when the number of message sends for a device 110 is to be incremented. The threshold value is indicative of a "transmission threshold". Exceeding the transmission threshold triggers increased transmissions to a radio communication device 110. The threshold could be, for instance, a function of a number of repeat requests, a number of repeat messages provided to a device 110, a rate of repeat requests or messages provided over time, or a percentage of missed messages. By way of example only, the transmission threshold is described hereinafter as a threshold value, i.e., a number. When the number of repeat requests by a device 110 equals the threshold value, the transmission threshold has been exceeded, resulting in a greater number of message transmissions being sent to a requesting radio communication device 110.

According to the present invention, the terminal 105 also comprises a sender 260 for transmitting messages according to the number of message sends and a request processor 255 for processing received repeat requests. Preferably, the sender 260 and request processor 255 are firmware elements stored in the system memory 245. Alternatively, the sender 260 and the request processor 255 could be implemented in hardware capable of performing equivalent operations.

Figure 3:
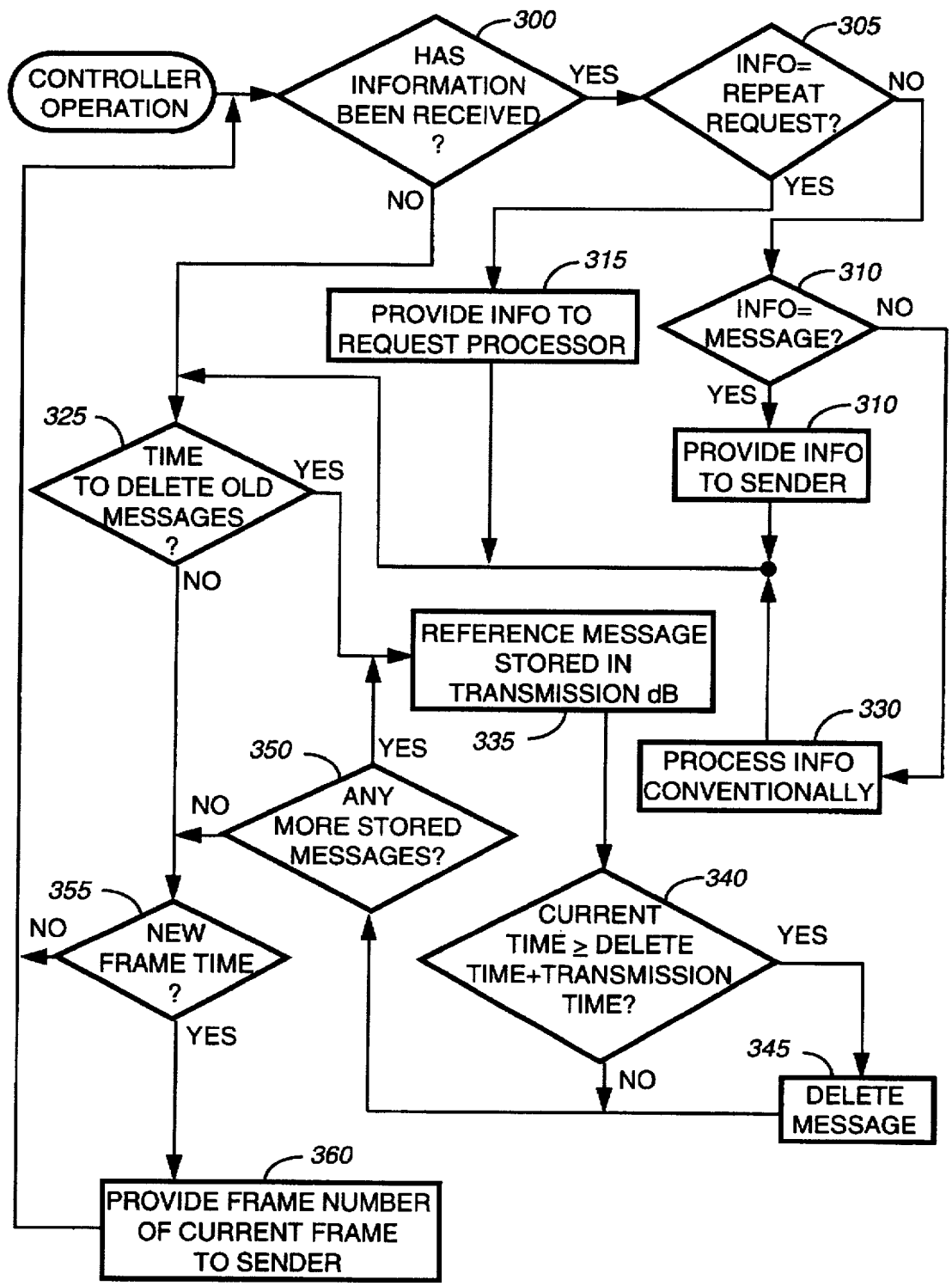
FIG. 3 is a flowchart of an operation of a controller included in the message transmission device of FIG. 2 in accordance with the present invention.

FIG. 3 is a flowchart illustrating an operation of the controller 210 included in the terminal 105. When, at steps 300, 305, a repeat request has been received from a radio communication device 110, the repeat request is provided, at step 315, to the request processor 255. When, at steps 300, 310, message information has been received, the message information is provided, at step 320, to the sender 260.

The controller 210 also monitors the clock 200. When, at step 325, the time values generated by the clock 200 indicate that it is time to delete old messages, the controller 210 references, at step 335, a message stored in the transmission database 250 (FIG. 2). When, at step 340, the current time is greater than or equal to the sum of the transmission time stored in the transmission database 250 and the delete time stored in the system memory 245, the message is deleted, at step 345. When, at step 350, additional messages are stored in the transmission database 250, processing continues at step 335. The deletion subroutine that occurs in steps 325, 335, 340, 345, and 350 provides a convenient method for deleting older messages so that memory space is made available. Preferably, the delete time is great enough to prevent the deletion of messages that could still be requested by radio communication devices 110. For instance, the delete time could be set as one week.

When, at step 355, the time values provided by the clock 200 indicate that a new frame time has arrived, the frame number of the current frame is provided, at step 360, to the sender 260.

Figure 4:
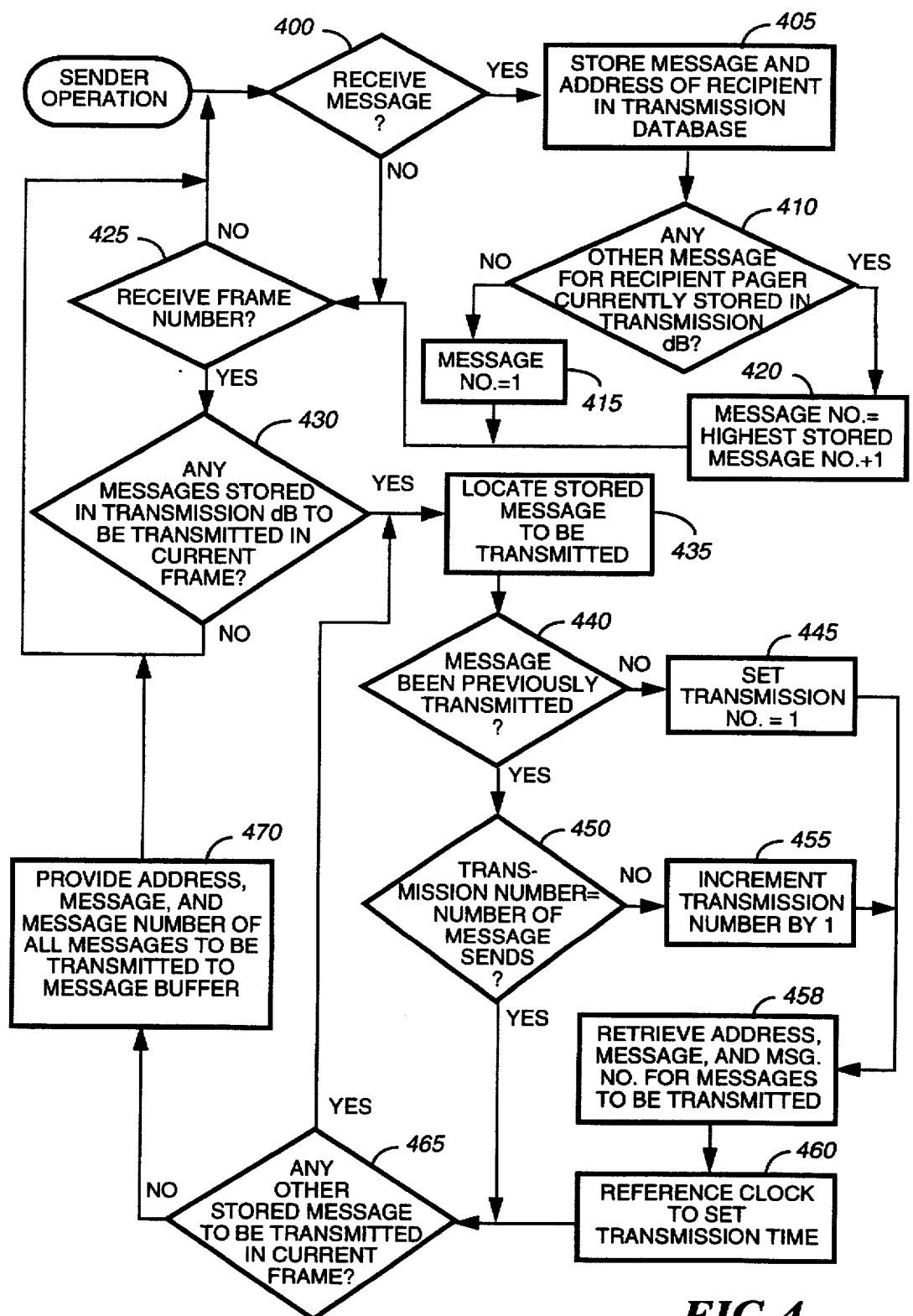
FIG. 4 is a flowchart of an operation of a sender included in the message transmission device of FIG. 2 in accordance with the present invention.

FIG. 4 is an operation of the sender 260 in accordance with the present invention. At step 400, the sender 260 receives a message, then, at step 405, stores the message and address of the recipient radio communication device 110, e.g., pager, in the transmission database 250. When, at step 410, no other messages for that device 110 are stored, the message number is set to one, at step 415. When other messages are stored for the recipient device 110, the message number is set, at step 420, to a value equivalent to the highest stored message number for that device 110 plus one, i.e., message number=highest stored number +1.

When, at step 425, a frame number is received from the controller 210 (FIG. 2), the sender 260 determines, at step 430, whether any messages stored in the transmission database 250 are to be transmitted in the current frame. A message to be transmitted is then, at step 435, located in the transmission database 250. When, at step 440, the located message has not been previously transmitted, the transmission number is set to one, at step 445. When the located message has been previously transmitted, the sender 260 determines, at step 450, whether the current stored transmission number is equivalent to the number of messages sends for the recipient radio communication device 110. When, at step 450, further transmissions are to be made, the transmission number is incremented by one, at step 455. Thereafter, for a message that is to be transmitted, the address, message, and message number are retrieved, at step 458, and the transmission time is set, at step 460, by referencing the clock 200.

When, at step 465, further stored messages are to be transmitted in the current frame, processing continues at step 435. Otherwise, the address, message, and message numbers of messages to be transmitted are provided, at step 470, to the message buffer 215.

Figure 5:
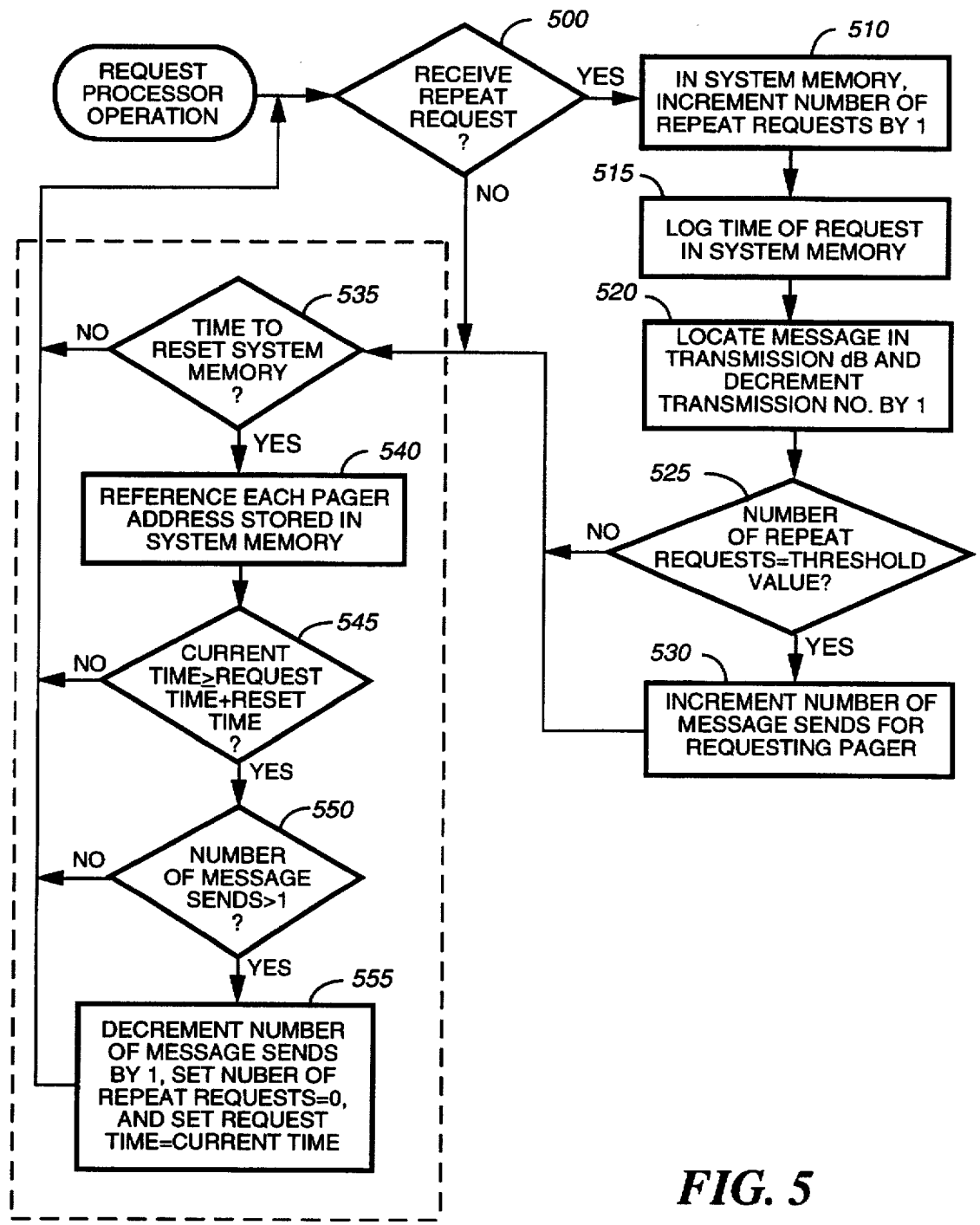
FIG. 5 is a flowchart depicting an operation of a request processor included in the message transmission device of FIG. 2 in accordance with the present invention.

FIG. 5 shows an operation of the request processor 255. In response to reception of a repeat request, at step 500, the number of repeat requests is incremented by one, at step 510, and the time of the request is logged in the system memory 245, at step 515. The message indicated in the repeat request is then, at step 520, located in the transmission database 250, and its transmission number is decremented by one, i.e., transmission number=transmission number −1. In this manner, the transmission number will indicate that a further transmission is to made for the message so that the sender 260 will provide the message to the message buffer 215 during the next frame in which messages are transmitted to the requesting radio communication device 110. In other words, decrementing the transmission number has the effect of causing a repeat message to be transmitted to the requesting device 110.

When, at step 525, the number of repeat requests for the requesting device 110 is equivalent to the threshold value stored in the system memory 245, the transmission threshold for the device 110 has been exceeded, and the request processor 255 increments the number of messages sends by one, at step 530. As mentioned above, however, the number of message sends could alternatively be incremented in response to other types of thresholds being exceeded. For instance, the number of message sends could be incremented in response to determining that a radio communication device 110 has missed or erroneously received a certain percentage of the messages provided to the device 110. Thereafter, one additional repeat of each future message will be provided to the device 110 to minimize the likelihood that the device 110 will miss messages in the future. As a result, the user of the device 110 will not have to request as many repeat messages.

When, at step 535, it is time to reset the system memory 245, the request processor 255 references, at step 540, each address stored in the system memory 245 to review each entry in the subscriber information. When, at step 545, the current time is greater than or equal to the sum of the reset time and the request time, i.e., the time of the most recent repeat request for the device 110 that is being referenced, and when, at step 550, the number of message sends is greater than one, the request processor 255 determines that the number of repeat messages provided to the device 110 can be reduced. This is done by decrementing the number of message sends by one, setting the number of repeat requests to zero, and setting the request time equal to the current time, at step 555.

Steps 535–555, which are located within the dashed lines, depict an optional reset procedure in which devices 110 that currently receive more than one message transmission are examined. When a device 110 that receives more than one message transmission has not requested a repeat in a long period of time, i.e., the reset time, the terminal 105 can conveniently reduce the number of repeats to more efficiently utilize the radio channel. When, however, the device 110 subsequently requests repeat messages a predetermined number of times, represented by the threshold value, the number of message sends will again be incremented to automatically provide more repeat messages to the device 110.

According to the present invention, the terminal 105 provides reliable messaging service while using the channel efficiently. This is accomplished by normally sending only one message to a device 110, i.e., setting a number of message sends to one. When, however, a device 110 makes a predetermined number of repeat requests, the terminal 105 automatically increments the number of message sends for that device 110 so that the device 110 has a greater number of chances to correctly receive future messages. The number of message sends can later be reduced to provide fewer repeat messages to the device 110 when no repeat requests have been received from the device 110 for a long time. For instance, a device 110 located in a fringe area can receive one or more repeat messages. Thereafter, when the device 110 is relocated in an area in which there is a greater signal strength, the number of repeats, which may now be unnecessary, can be reduced.

It will be appreciated by one of ordinary skill in the art that communication systems generally have peak times, in which there is a lot of message traffic, and off-peak times, in which the capacity of a system is not fully utilized. Therefore, according to an alternate embodiment of the present invention, the number of message repeats can be varied in response to messaging traffic.

Figure 6:
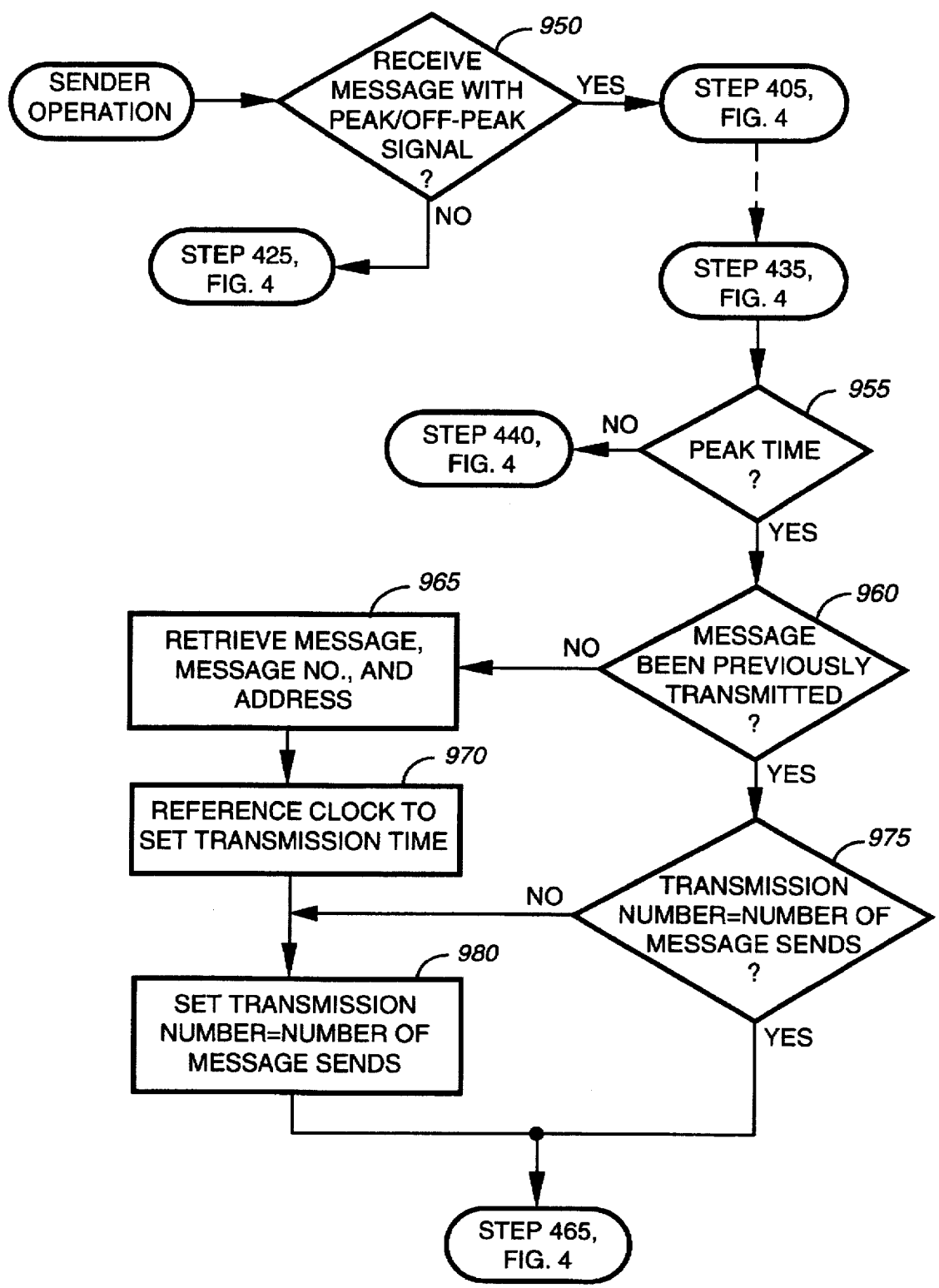
FIG. 6 is a flowchart of an alternative operation of the sender included in the message transmission device of FIG. 2 in accordance with the present invention.

Referring to FIG. 6, a flowchart illustrates the operation of the sender 260 according to the alternate embodiment of the present invention, in which the controller 210 determines whether it is a peak or an off-peak time and notifies the sender 260. At step 950, the sender 260 receives a message and a signal indicating whether it is currently a peak or off-peak time. When it is an off-peak time, processing occurs as previously described with reference to FIG. 4. Specifically, most devices 110 receive a single message transmission, while devices 110 located in fringe areas receive repeat messages.

When, at step 955, it is a peak time, the sender 260 determines, at step 960, whether a stored message has been previously transmitted. When the message has not been previously transmitted, the message, message number, and address are retrieved, at step 965, and the dock 200 (FIG. 2) is referenced to set the transmission time, at step 970. The transmission number is then set, at step 980, to the number of message sends so that no further transmissions of the same message will occur. When, at steps 960, 975, the message has been previously transmitted and the transmission number is not yet equivalent to the number of message sends for the addressed device 110, the transmission number is set, at step 980, to the number of message sends to prevent further transmissions of the message. Next, processing continues at step 465 to locate further messages that are to be transmitted.

The flowchart of FIG. 6 illustrates a process in which, during peak times, the transmission of duplicate messages is inhibited even for radio communication devices 110 that have made a large number of repeat requests. In other words, during peak hours, messages to all devices 110 are transmitted only once. During off-peak hours, on the other hand, devices 110 located in fringe areas can receive multiple message transmissions. The process according to the alternate embodiment of the present invention advantageously prevents overcrowding of communication channels during times when system traffic is heavy, while still decreasing the risk of missed messages during other times when system traffic is light.

According to another alternate embodiment of the present invention, duplicate messages could automatically be provided to all radio communication receivers 110 during off-peak times, regardless of whether any particular radio communication device 110 has previously made a large number of repeat requests. During peak times, on the other hand, all radio communication devices 110 would receive only a single transmission of each message to prevent overcrowding of communication channels.

Figure 7:
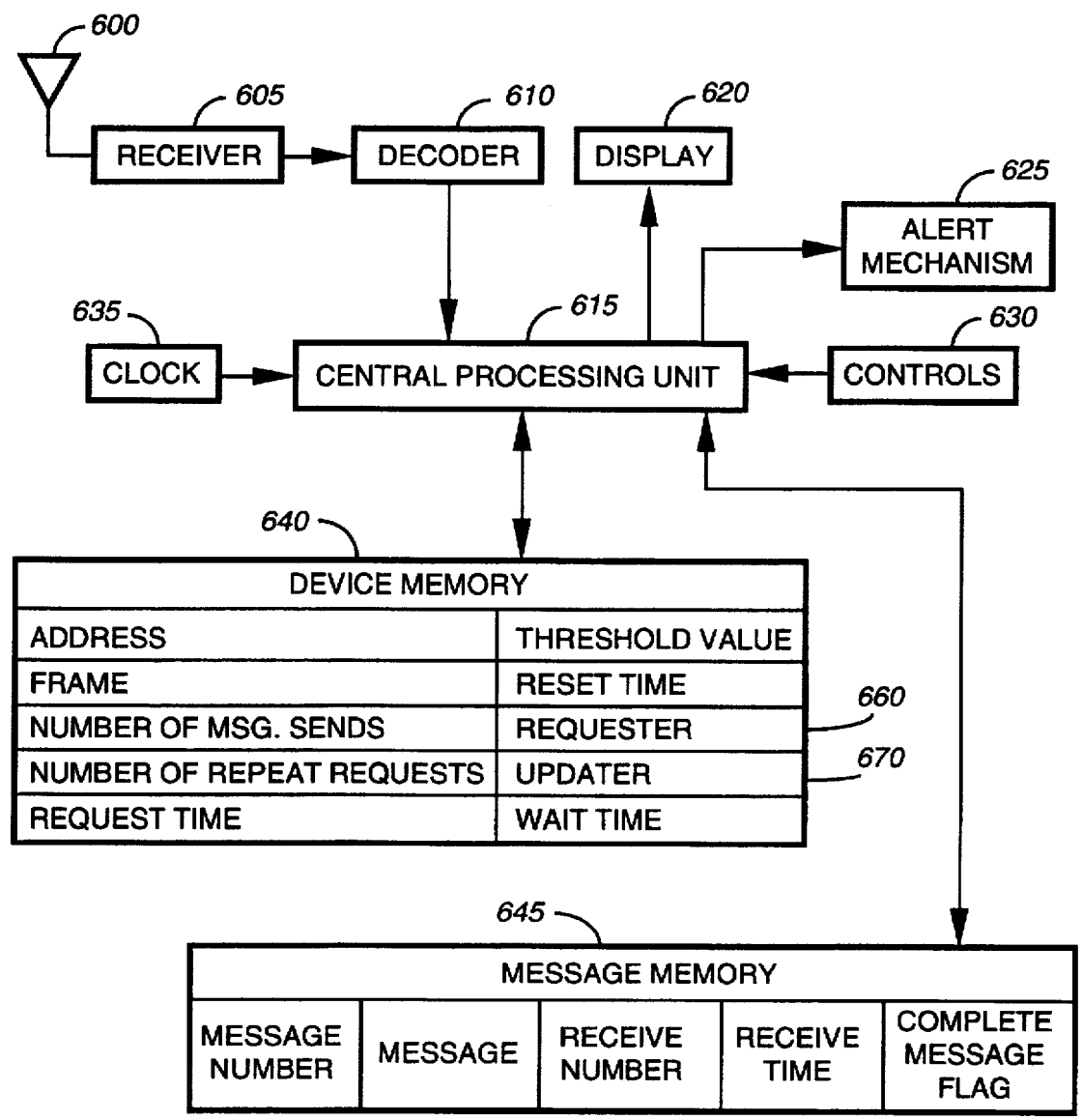
FIG. 7 is an electrical block diagram of a radio communication device for receiving the messages transmitted by the message transmission device of FIG. 2 in accordance with the present invention.

Referring next to FIG. 7, an electrical block diagram of a radio communication device 110 is shown. The radio communication device 110 includes an antenna 600 for receiving radio frequency signals, a receiver 605 for demodulating the signals, and a decoder 610 for decoding the demodulated signals to generate a stream of data. A central processing unit (CPU) 615 coupled to the decoder 610 further processes the data and also controls operations of the radio communication device 110. The device 110 further includes a dock 635 for providing time values, an alert mechanism 625 for announcing message reception, a display 620 for presenting messages, and controls 630 for providing user-initiated signals to the CPU 615.

Additionally, a message memory 645 is coupled to the CPU 615 for storing received messages. Preferably, the message memory 645 stores a received message, a message number associated with the message, a receive number indicative of how many times the same message has been received, a receive time indicative of the time the message was last received, and a complete message flag that indicates whether a complete message has been formed.

A device memory 640 stores operational parameters such as a device address, frames in which the device 110 receives messages, the threshold value, the reset time, and a predetermine time, i.e., a wait time, expiration of which triggers generation of a request message instructing the user to make a repeat request for an incorrectly received message. The device memory 640 also stores the number of message sends for the device 110, the number of repeat requests, and a request time indicative of the time that the most recent request message has been displayed to the user.

According to the present invention, a requester 660 included in the radio communication device 110 alerts a user that a message has been missed, and an updater 670 periodically resets parameters in the device memory 640. The requester 660 and the updater 670 are preferably implemented as firmware elements stored in the device memory 640, although they can alternatively be implemented using hardware capable of performing equivalent operations.

Figure 8:
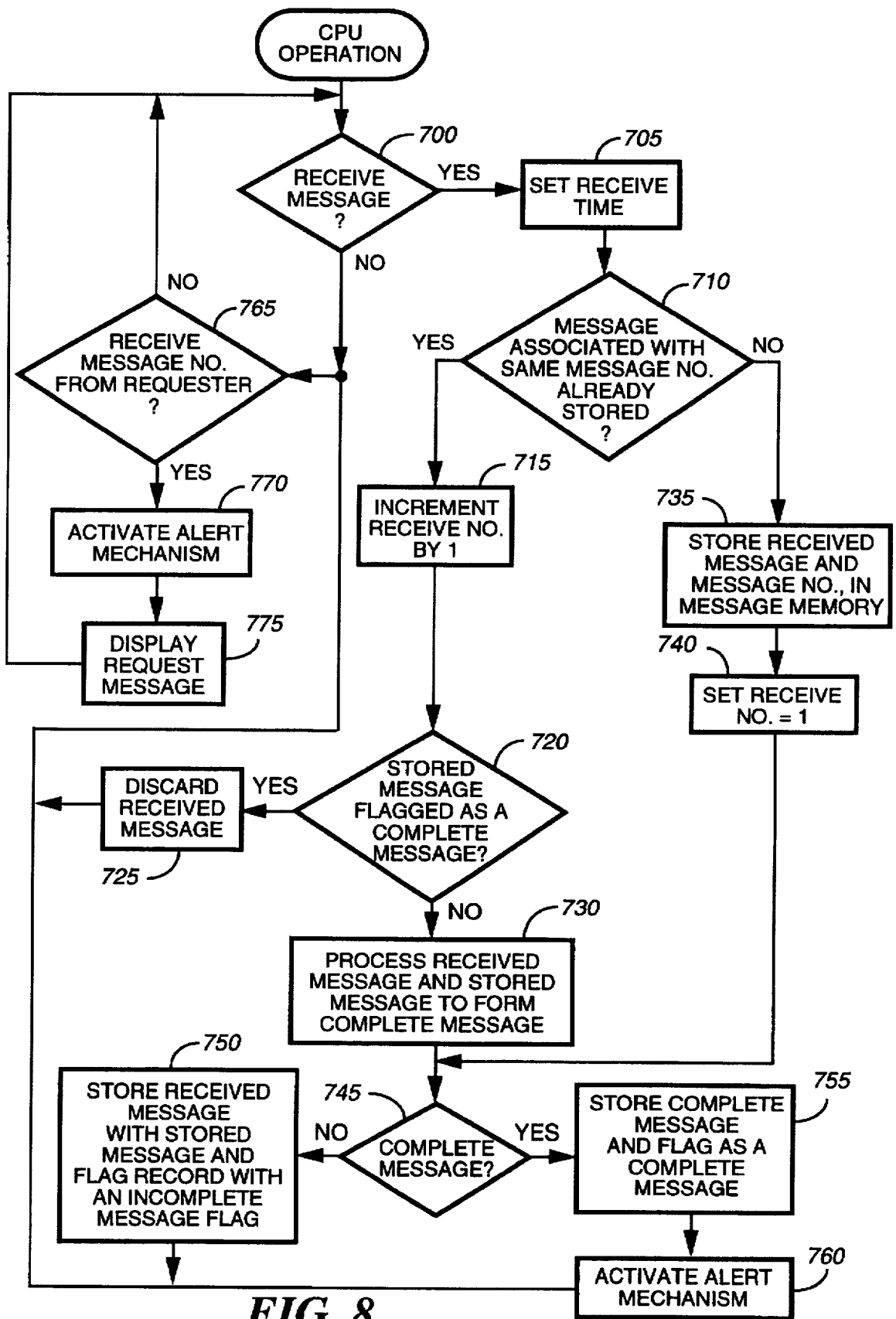
FIG. 8 is a flowchart illustrating an operation of a central processing unit included in the radio communication device of FIG. 7 in accordance with the present invention.

FIG. 8 is a flowchart of an operation of the CPU 615. When, at step 700, a message is received, the receive time is set in the message memory 645, at step 705. When, at step 710, no message associated with the same message number has been previously stored, the received message and message number are stored, at step 735, in the message memory 645. The receive number is then set to one, at step 740. When, at step 710, a message with the same message number has already been stored, the receive number is incremented by one, at step 715. When, at step 720, the previously stored message is flagged as a complete message, the received message is discarded, at step 725.

As mentioned above, the messages transmitted in the system 100 are preferably numbered. Therefore, when the message number precedes the current message in the incoming radio frequency signal, the CPU 615 can perhaps determine whether another complete message with the same number has already been stored before the current message has been completely received. In such a situation, the CPU 615 need not wait until the current message has been entirely received before discarding it, at step 725. Instead, the CPU 615 can stop receiving the message and disable the receiver 605 for conventional battery saving.

When, at step 720, the stored message is not complete, the received message and the stored message are processed in a conventional manner, at step 730, to attempt to form a complete message. For example, when the received message is itself complete and without errors, the stored message can simply be replaced with the received message. Otherwise, bit combining or word combining could be performed to form a complete message.

When, at step 745, a complete message cannot be formed, both messages, i.e., the previously stored message and the received messages, are stored in the message record, and the record is flagged, at step 750, to indicate that the message is incomplete. When, at step 745, a complete message is formed, the complete message is stored and flagged as complete, at step 755. Thereafter, the alert mechanism 625 is activated, at step 760, to announce reception of a message.

The CPU 615 can also receive a message number from the requester 660, at step 765, in which case the user is alerted that a message has been missed. This can be done, for instance, by activating the alert mechanism 625, at step 770, and displaying a request message including the message number, at step 775.

Figure 9:
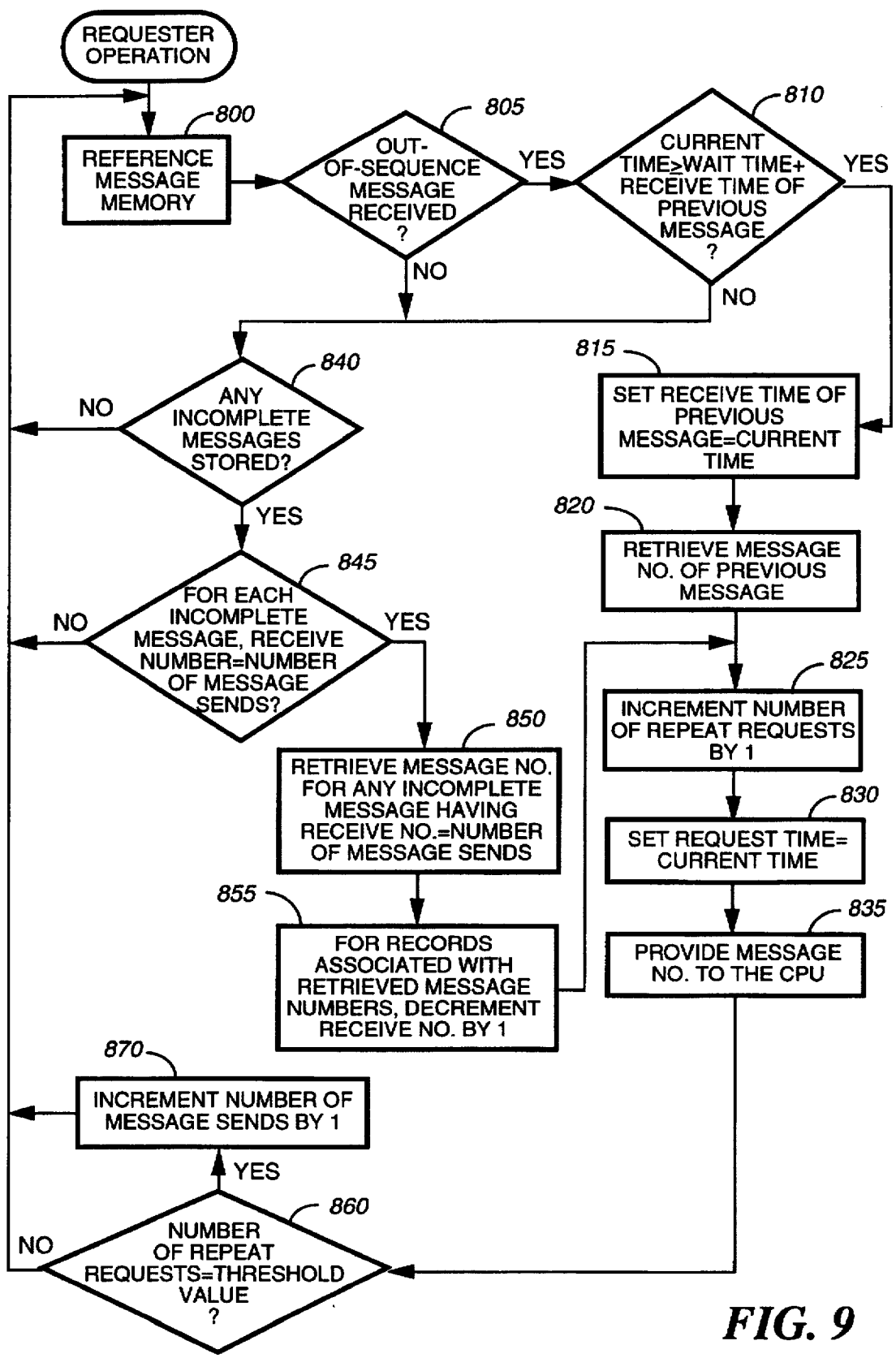
FIG. 9 is a flowchart depicting an operation of a requester included in the radio communication device of FIG. 7 in accordance with the present invention.

FIG. 9 is flowchart illustrating an operation of the requester 660. At step 800, the requester 660 references the message memory 645. When, at step 805, an out-of-sequence message has been received, the requester 660 determines, at step 810, whether a repeat request should be made to request retransmission of a missed message. This is done by determining whether the current time is greater than or equal to the sum of the stored wait time and the stored receive time associated with the previous message, i.e., the message having a message number equal to the message number of the out-of-sequence message minus one. It will be appreciated that when a previous message has been missed entirely, the receive time would be set to zero. Preferably, the wait time is great enough so that all repeats of a message, when repeats are to be received, would have been normally been received before a repeat request is triggered.

When the current time is greater than or equal to the wait time plus the receive time, the receive time of the previous message is set, at step 815, to the current time to prevent situations in which a user is again alerted to a missed message before the terminal 105 has had sufficient time to retransmit the missed message. Thereafter, the message number of the previous message is retrieved, at step 820, and the number of repeat requests is incremented by one, at step 825. The request time is set, at step 830, to the current time, and the message number is provided, at step 835, to the CPU 615 to trigger presentation of a request message.

In this manner, the requester 660 determines whether the time that has passed since reception of an out-of-sequence message is long enough so that a previous message should have already been correctly received. In such a case, the requester 660 signals the CPU 615 to indicate that a request message should be presented to the user.

A request message can also be displayed to the user in response to determining that a complete message has not been formed even after reception of all repeat messages that are scheduled to be transmitted by the terminal 105. When, at step 840, an incomplete message is located in the message memory 645, the receive number is compared to the number of message sends. When, at step 845, the receive number equals the number of message sends, the message number is retrieved, at step 850, and the receive number is decremented by one, at step 855. Decreasing the receive number by one prevents the user from being alerted with a request message for the same message before a repeat message has had a chance to be transmitted again by the terminal 105. Next, processing continues at step 825 to increment the number of repeat requests, set the request time, and signal the CPU 615.

When, at step 860, the number of repeat requests is equal to the stored threshold value, indicating that the transmission threshold has been exceeded, the number of message sends is incremented by one, at step 870. Steps 860 and 870 mirror the operation of the terminal 105. Specifically, the radio communication device 110 also keeps up with the number of repeat messages that are provided to the device 110. In this manner, the radio communication device 110 conveniently awaits all transmissions for a particular message number prior to alerting the user with a request message.

Figure 10:
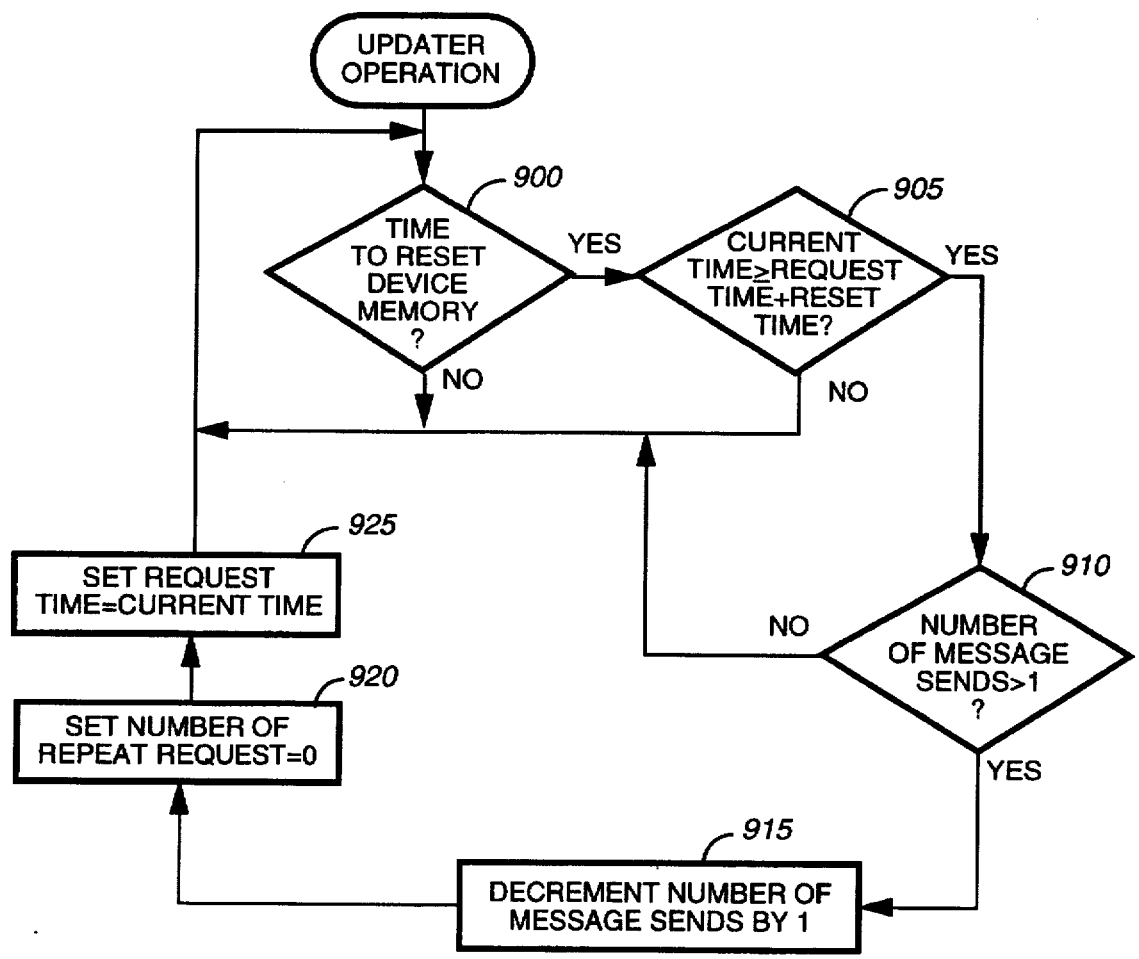
FIG. 10 is a flowchart depicting an operation of an updater included in the radio communication device of FIG. 7 in accordance with the present invention.

Referring next to FIG. 10, a flowchart of an operation of the updater 670 is depicted. When, at step 900, the updater 670 determines that it is time to update the device memory 640, the updater 670 determines, at step 905, whether the current time is greater than or equal to the sum of the request time and the reset time. When so, and when, at step 910, the number of message sends is greater than one, the number of message sends is decremented by one, at step 915. Then, at step 920, the number of repeat requests is set to zero, and, at step 925, the request time is set to the current time.

As mentioned above, the process of reducing the number of transmissions of the same message is optional. However, when the terminal 105 is programmed to reduce the number of repeat transmissions, such as when a device 110 has not requested a repeat for a long period of time, the updater 670 should be employed to reset the device memory 640 such that the radio communication device 110 stores the appropriate number of message sends according to which messages are transmitted by the terminal 105.

In summary, the communication system described above includes a message transmission device, e.g., a terminal, for transmitting messages and radio communication devices, e.g., selective call receivers, for receiving the messages. Messages are initially transmitted to the radio communication devices only a single time. However, when a radio communication device makes a predetermined number of requests for retransmissions of messages, the terminal begins sending a repeat messages to the device. In this manner, a radio communication device that has had difficulty with reception is provided with multiple transmissions of the same message to decrease the risk of missed or erroneously received messages. Other radio communication receivers continue to receive only a single transmission of each message. Therefore, the radio communication channel is not clogged with unnecessary message repeats. Instead, only radio communication devices that will benefit from repeat messages receive them.

It will be appreciated by now that there has been provided a method and apparatus for reducing the likelihood of missed messages while efficiently utilizing the communication channel.

What is claimed is:

1. A communication system for selectively providing repeat messages, the communication system comprising:
 a message transmission device for transmitting messages a single time, for receiving repeat requests indicating that a previously transmitted message should be transmitted again, and for automatically transmitting future messages more than once in response to determining that a transmission threshold has been exceeded; and
 a radio communication device for receiving the messages and for generating a repeat request in response to determining that the previously transmitted message has not been correctly received.

2. The communication system of claim 1, wherein the message transmission device comprises:
 a system memory for storing an address of the radio communication device, a number of times a message is to be sent to the radio communication device, and a number of repeat requests that has been generated by the radio communication device; and
 a request processor coupled to the system memory for incrementing the number of times a message is to be sent to the radio communication device in response to determining that the transmission threshold has been exceeded.

3. The communication system of claim 2, wherein the transmission threshold comprises a threshold value that is compared to the number of repeat requests by the radio communication device to determine whether the transmission threshold has been exceeded.

4. The communication system of claim 2, wherein the message transmission device further comprises:
 a database coupled to the system memory and the request processor for storing the messages transmitted to the radio communication device and for storing transmission numbers indicating how many times the messages have been transmitted; and
 a sender coupled to the database for transmitting the messages to the radio communication device in accordance with the number of times a message is to be sent.

5. The communication system of claim 2, wherein the message transmission device further comprises:
 a controller coupled to the system memory and the request processor for determining peak and off-peak times; and
 a sender coupled to the controller for transmitting, during off-peak times, the messages in accordance with the number of times a message is to be sent and for transmitting, during peak times, the messages only once regardless of the number of times a message is to be sent.

6. The communication system of claim 2, wherein the radio communication device comprises:
 a device memory for storing the number of times a message is to be sent to the radio communication device and the number of repeat requests that have been generated in response to not receiving previously transmitted messages correctly; and
 a requester coupled to the device memory for generating the repeat requests and for incrementing the number of times a message is to be sent in response to determining that the transmission threshold has been exceeded.

7. The communication system of claim 6, wherein the number of repeat requests is indicative of both a number of missed messages and a number of incorrectly received messages.

8. The communication system of claim 6, wherein the radio communication device further comprises:
 a message memory coupled to the device memory for storing the messages received by the radio communication device; and
 an updater coupled to the device memory for resetting the number of repeat requests in accordance with a reset time.

9. A message transmission device for selectively transmitting repeat messages, the message transmission device comprising:
 a transmitter for transmitting messages a single time; and
 a data port coupled to the transmitter for receiving repeat requests indicating that a previously transmitted message should be transmitted again, wherein future messages are automatically transmitted more than once in response to determining that a transmission threshold has been exceeded.

10. The message transmission device of claim 9, further comprising:
 a system memory for storing a number of times a message is to be sent to a radio communication device and a number of repeat requests that have been generated by the radio communication device; and
 a request processor coupled to the system memory for incrementing the number of times a message is to be sent to the radio communication device in response to determining that the transmission threshold has been exceeded.

11. The message transmission device of claim 10, wherein the transmission threshold comprises a threshold value that is compared to the number of repeat requests to determine whether the transmission threshold has been exceeded.

12. The message transmission device of claim 10, further comprising:
   a database coupled to the system memory and the request processor for storing the messages transmitted to the radio communication device and for storing transmission numbers indicating how many times the messages have been transmitted; and
   a sender coupled to the database for transmitting the messages to the radio communication device in accordance with the number of times a message is to be sent.

13. The message transmission device of claim 10, further comprising:
   a controller coupled to the system memory and the request processor for determining peak and off-peak times; and
   a sender coupled to the controller for transmitting, during off-peak times, the messages in accordance with the number of times a message is to be sent and for transmitting, during peak times, the messages only once regardless of the number of times a message is to be sent.

14. A radio communication device for receiving messages, comprising:
   a device memory for storing a number of times a message is to be sent to the radio communication device and a number of repeat requests generated by the radio communication device;
   a receiver coupled to the device memory for receiving the messages; and
   a requester coupled to the device memory for generating repeat requests in response to not receiving previously transmitted messages correctly and for incrementing the number of times a message is to be sent in response to determining that a transmission threshold has been exceeded.

15. The radio communication device of claim 14, wherein the repeat requests are indicative of a number of missed messages and a number of incorrectly received messages.

16. The radio communication device of claim 14, wherein the transmission threshold comprises a threshold value that is compared to the number of repeat requests to determine whether the transmission threshold has been exceeded.

17. The radio communication device of claim 16, further comprising:
   a message memory coupled to the device memory for storing the messages received by the radio communication device;
   a clock coupled to the message memory for providing time values thereto; and
   an updater coupled to the clock for resetting the number of repeat requests in accordance with a reset time.

18. The radio communication device of claim 17, further comprising:
   a processing unit coupled to the receiver and the message memory for determining that a current message is equivalent to one of the messages stored in the message memory, in response to which the processing unit disables the receiver for battery saving.

19. A method, in a message transmission device, for selectively providing repeat messages to a radio communication device, the method comprising the steps of:

transmitting messages to the radio communication device a single time;
   receiving repeat requests indicating that a message has not been correctly received by the radio communication device; and
   transmitting future messages more than once in response to receiving a number of repeat requests that exceeds a transmission threshold.

20. The method of claim 19, furrier comprising the steps of:
   storing, prior to the receiving step, a number of messages to be sent to the radio communication device;
   updating, in response to the receiving step, a stored number of repeat requests;
   determining that the stored number of repeat requests is equivalent to a threshold value; and
   incrementing, prior to the transmitting step, the number of messages to be sent in response to the determining step.

21. The method of claim 20, wherein the transmitting step comprises the step of:
   transmitting the future messages in accordance with the number of messages to be sent.

22. The method of claim 21, wherein:
   the method further comprising the step of:
      determining, prior to the transmitting step, whether a current time is an off-peak time or a peak time; and
   the transmitting step comprises the steps of:
      transmitting, in response to determining that the current time is an off-peak time, the future messages in accordance with the number of messages to be sent; and
      transmitting, in response to determining that the current time is an off-peak time, the future messages only once regardless of the number of messages to be sent.

23. A method, in a radio communication device, for receiving repeat messages, the method comprising the steps of:
   determining that a transmitted message has not been correctly received; and
   generating, in response to the determining step, a repeat request when a predetermined time has elapsed after the determining step, wherein the predetermined time is a function of a stored number of repeat requests.

24. The method of claim 23, further comprising the steps of:
   receiving, subsequent to the determining step, the transmitted message within the predetermined time, in response to which the generating step does not occur.

25. The method of claim 24, further comprising the steps of:
   storing a number of times a message is to be sent to the radio communication device; and
   incrementing the number of times a message is to be sent when the stored number of repeat requests exceeds a transmission threshold.

26. The method of claim 25, wherein the determining step comprises the steps of:
   determining that the transmitted message has been missed; and
   determining that the transmitted message has been erroneously received.

* * * * *

UNITED STATES PATENT AND TRADEMARK OFFICE
CERTIFICATE OF CORRECTION

PATENT NO. : 5,701,312
DATED : December 23, 1997
INVENTOR(S) : DeLuca et al.

It is certified that error appears in the above-indentified patent and that said Letters Patent is hereby corrected as shown below:

Column 12, line 9, delete "furrier" and insert --further--

Signed and Sealed this

Twenty-fifth Day of April, 2000

Attest:

Q. TODD DICKINSON

Attesting Officer

Director of Patents and Trademarks